United States Patent [19]

Bauman et al.

[11] Patent Number: 5,903,918
[45] Date of Patent: *May 11, 1999

[54] PROGRAM COUNTER AGE BITS

[75] Inventors: James A. Bauman, Palo Alto; Paul Chang, Fremont; Govind Kizhepat, Sunnyvale, all of Calif.

[73] Assignee: Sun Microsystems, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/518,562

[22] Filed: Aug. 23, 1995

[51] Int. Cl.⁶ ...................................................... G06F 9/32
[52] U.S. Cl. ...................... 711/220; 711/200; 395/800.01
[58] Field of Search .................................... 395/800, 376, 395/391, 800.01, 381, 571, 737; 711/202, 220, 221, 200, 213, 214

[56] References Cited

U.S. PATENT DOCUMENTS

| | | | |
|---|---|---|---|
| 4,615,006 | 9/1986 | Hirano | 395/412 |
| 5,487,156 | 1/1996 | Popescu et al. | 395/393 |
| 5,519,864 | 5/1996 | Martell et al. | 395/391 |
| 5,530,823 | 6/1996 | Tsuchiya et al. | 395/417 |
| 5,542,109 | 7/1996 | Blomgren et al. | 395/581 |
| 5,564,111 | 10/1996 | Glew et al. | 395/185.06 |
| 5,592,636 | 1/1997 | Popescu et al. | 395/586 |
| 5,797,025 | 8/1998 | Popescu et al. | 395/800.11 |

*Primary Examiner*—Meng-Ai T. An
*Assistant Examiner*—Walter D. Davis, Jr.
*Attorney, Agent, or Firm*—Blakely Sokoloff Taylor & Zafman

[57] ABSTRACT

An apparatus and method of efficiently and dynamically generating the addresses associated with a set of instructions in a microprocessor pipeline is disclosed. Program counter age bits associated with the offsets of an address of a predetermined instruction within a set of instructions are used to indicate the chronological age of each instruction within the set of instructions. The age bits are generated by a logic circuit which also dispatches instructions to various execution units. The age bits are used to maintain and track the addresses of an instruction stream within a processing system so that there is no need to store the addresses of each and every instruction.

12 Claims, 12 Drawing Sheets

LOGIC TABLE

PIPE_TRAP = 1

PIPE_VALID = 1

| PIPE_AGE[1] | PIPE_AGE[0] | PIPE_TRAP_AGE0 | PIPE_TRAP_AGE1 | PIPE_TRAP_AGE2 | PIPE_TRAP_AGE3 |
|---|---|---|---|---|---|
| 0 | 0 | 1 | 0 | 0 | 0 |
| 0 | 1 | 0 | 1 | 0 | 0 |
| 1 | 0 | 0 | 0 | 1 | 0 |
| 1 | 1 | 0 | 0 | 0 | 1 |

LOGIC TABLE

| TRAP_AGE0 | TRAP_AGE1 | TRAP_AGE2 | TRAP_AGE3 | TRAP_PC_OFFSET[1] | TRAP_PC_OFFSET[0] |
|---|---|---|---|---|---|
| 0 | 0 | 0 | 0 | 0 | 0 |
| 0 | 0 | 0 | 1 | 1 | 1 |
| 0 | 0 | 1 | 0 | 1 | 0 |
| 0 | 0 | 1 | 1 | 1 | 0 |
| 0 | 1 | 0 | 0 | 0 | 1 |
| 0 | 1 | 0 | 1 | 0 | 1 |
| 0 | 1 | 1 | 0 | 0 | 1 |
| 0 | 1 | 1 | 1 | 0 | 1 |
| 1 | 0 | 0 | 0 | 0 | 0 |
| 1 | 0 | 0 | 1 | 0 | 0 |
| 1 | 0 | 1 | 0 | 0 | 0 |
| 1 | 0 | 1 | 1 | 0 | 0 |
| 1 | 1 | 0 | 0 | 0 | 0 |
| 1 | 1 | 0 | 1 | 0 | 0 |
| 1 | 1 | 1 | 0 | 0 | 0 |
| 1 | 1 | 1 | 1 | 0 | 0 |

Fig. 8b

PROGRAM COUNTER AGE BITS

BACKGROUND OF THE INVENTION

1. Field of the Invention

The present invention relates generally to an apparatus and method of maintaining the addresses of instructions in a processor pipeline. More particularly, the present invention relates to an apparatus and method of maintaining the address offsets of each instruction with respect to the address of a predetermined instruction within a set of instructions in a processor pipeline.

2. Description of the Prior Art

Every instruction executed by a microprocessor has an associated address that describes its location in memory. In a superscalar microprocessor such as the UltraSPARC microprocessor, up to four instructions may be executed simultaneously. With the possibility of up to four instructions being executed in every given clock cycle, four unique addresses associated with the four different instructions will have to be tracked when handling or executing unexpected procedural calls known as traps. When traps occur, the normal flow of execution of the instructions is interrupted and software codes for handling such traps are executed to handle the traps. After attending to the traps, the processor has to return to the point of interruption in the instruction stream, so that normal processing may continue.

In conventional microprocessors, traps typically result in a vectored transfer of control to supervisor software through a trap table. A trap may be caused by the presence of an exception, a trap instruction or an interrupt. When an exception occurs, the processor cannot continue executing the current instruction stream without software intervention. The exceptions are detected near the last pipeline stage right before the results of the instructions are written back to the processor register file. Thus, an exception can occur for any of the instructions within a set of instructions in the pipeline. For example, in an N-way superscalar microprocessor, instructions are dispatched in groups of one to N. If the youngest or most recent instruction in a group takes the exception, an address is needed for the instruction that is interrupted. In such a microprocessor, a large number of addresses in the instruction stream must be recorded so as to maintain the correct address for processing the trap, and so that program execution may be resumed following completion of trap processing. Thus, an N-way superscalar processor with P pipeline stages and 64-bit instruction addresses will have to store P×N 64-bit addresses. This involves the use of significant chip area and also impacts processor performance.

Accordingly, there is a need in the technology for an efficient means of tracking a series of addresses during processing and for maintaining the address associated with the specific instruction that was interrupted.

In addition, some microprocessors such as the UltraSPARC microprocessor are designed to store the address of the instruction that was interrupted and the address of the following instruction to be executed. In a microprocessor which utilizes pipeline processing, a number of sequential steps are involved from the beginning of the execution of an instruction until completion. Since a series of steps has to be executed between the beginning of execution of the instruction and the time that results are written back to the processor register file, there is a time lag between the occurrence of these two events. As a result, the addresses associated with the instruction have to be precisely tracked and maintained for each step.

Accordingly, there is a need in the art for an apparatus and method of efficiently and dynamically generating the addresses of each instruction in a microprocessor pipeline without having to store the address of each and every instruction in the pipeline, thus decreasing the required space on the chip and reducing processing time. In addition, there is a need in the technology for an efficient means for tracking and storing the addresses associated with the instructions in each process step in a processor pipeline.

BRIEF SUMMARY OF THE INVENTION

An apparatus and method of efficiently and dynamically generating the addresses associated with a set of instructions in a microprocessor pipeline is disclosed. Program counter age bits associated with the offsets of an address of a predetermined instruction within a set of instructions are used to indicate the chronological age of each instruction within the set of instructions. The age bits are generated by a logic circuit which also dispatches instructions to various execution units. The age bits are used to maintain and track the addresses of an instruction stream within a processing system so that there is no need to store the addresses of each and every instruction.

BRIEF DESCRIPTION OF THE DRAWINGS

FIG. 2b is a detailed block diagram of a portion of the Prefetch/Dispatch Logic 30 depicted in FIG. 2a.

FIG. 6b is a logic table corresponding to the schematic diagram of FIG. 6a.

FIG. 8b is a logic table corresponding to the schematic diagram of FIG. 8a.

DETAILED DESCRIPTION OF THE INVENTION

The present invention relates to an apparatus and method of efficiently and dynamically generating the addresses of each instruction within a group of instructions in a microprocessor pipeline without having to store the address of each and every instruction in the pipeline. The present invention utilizes program counter age bits associated with a group of instructions to maintain and track the instruction stream within a processing system.

The addresses in an instruction stream are always sequential unless and until a control transfer instruction ("CTI") is executed. CTIs include address-relative branches and calls, register-indirect jumps and conditional traps. Most of the CTIs as designated for the SPARC microprocessor architecture, the UltraSPARC microprocessor architecture and many other microprocessor architectures are delayed; that is, the instruction immediately following a CTI in logical sequence is dispatched before the control transfer to the target address is completed. If the instruction stream is sequential, each instruction address is separated from the address of the next instruction by the number of bytes in the instruction. For example, an N-way superscalar processor can execute up to N instructions per cycle. Thus, if the first instruction in the superscalar pipeline has an instruction address of "a", the present invention will store the next instruction address as an address of "a+4", and the following instruction address as an address of "a+8" and so on. Thus, the address of the oldest instruction (i.e., the instruction which was received first within a group of instructions) and the "ages" of the following instructions are used in the present invention to maintain the addresses of other instructions within the same group.

When traps occur, normal execution of the current instruction stream is interrupted so that software may be executed to process or handle the traps. The traps are detected near the last stage of execution right before the results are written back to the processor register file. An exception or trap can occur for any of the instructions within a set of instructions. If, for example, the youngest instruction in the group takes the exception, an address is needed for the instruction that is interrupted. For a microprocessor such as the SPARC, which utilizes delayed CTIs, another address is required for the next active instruction, which can be stored anywhere in the previous pipeline stages, all the way back to the point where the instruction is dispatched into the series of pipeline stages.

To track and maintain the addresses in an instruction stream, the present invention utilizes age bits to calculate the address offsets of a stream of instructions with respect to the address of the first instruction in the group. To facilitate the tracking of these instructions as they are propagated down the pipeline, the present invention also identifies each of these instructions by using another bit called a valid bit in conjunction with the age bits, as will be described in detail in the following sections. In this manner, addresses in the instruction stream can be efficiently tracked, the correct address for processing the trap may be efficiently stored, and program execution may resume following completion of trap processing.

Figure 1A:
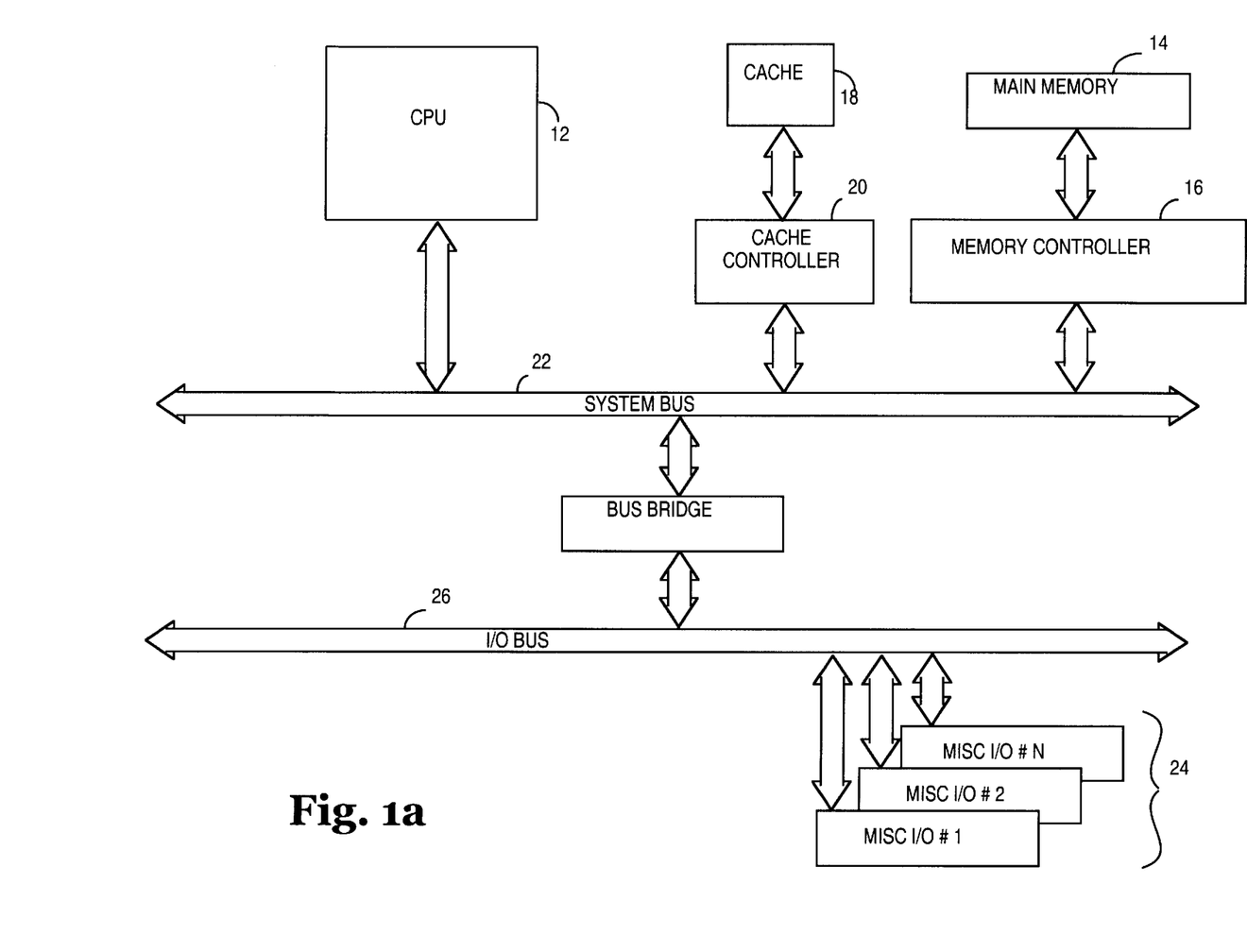
FIG. 1a is a system block diagram of an exemplary processor system in which the program counter age bits of the present invention are used.

The present embodiment is described in reference to a common bus processor system with shared memory and resources. FIG. 1a illustrates a conventional processor system 10 which contains a central processing unit (CPU) 12, main memory 14 which is coupled to and controlled by memory controller 16, and cache memory 18 which is coupled to and controlled by cache controller 20. The CPU 12 and memory controller 16 are coupled to a System Bus 22. The processor system 10 may also include various I/O and peripheral modules (i.e., MISC I/O #1, MISC I/O #2, . . . , MISC I/O #N) 24, which are coupled along an I/O bus 26. It should be understood, however, that further devices may be installed on the system bus 22 and on the I/O bus 26, as well known in the art. In one preferred embodiment, a UPA bus is used as System Bus 22 and an S-bus is used as I/O bus 26. The bus bridge 28 provides an interface between the system bus 22 and the I/O bus 26 to arbitrate the data flow between the peripheral devices and the system bus 22.

Figure 1B:
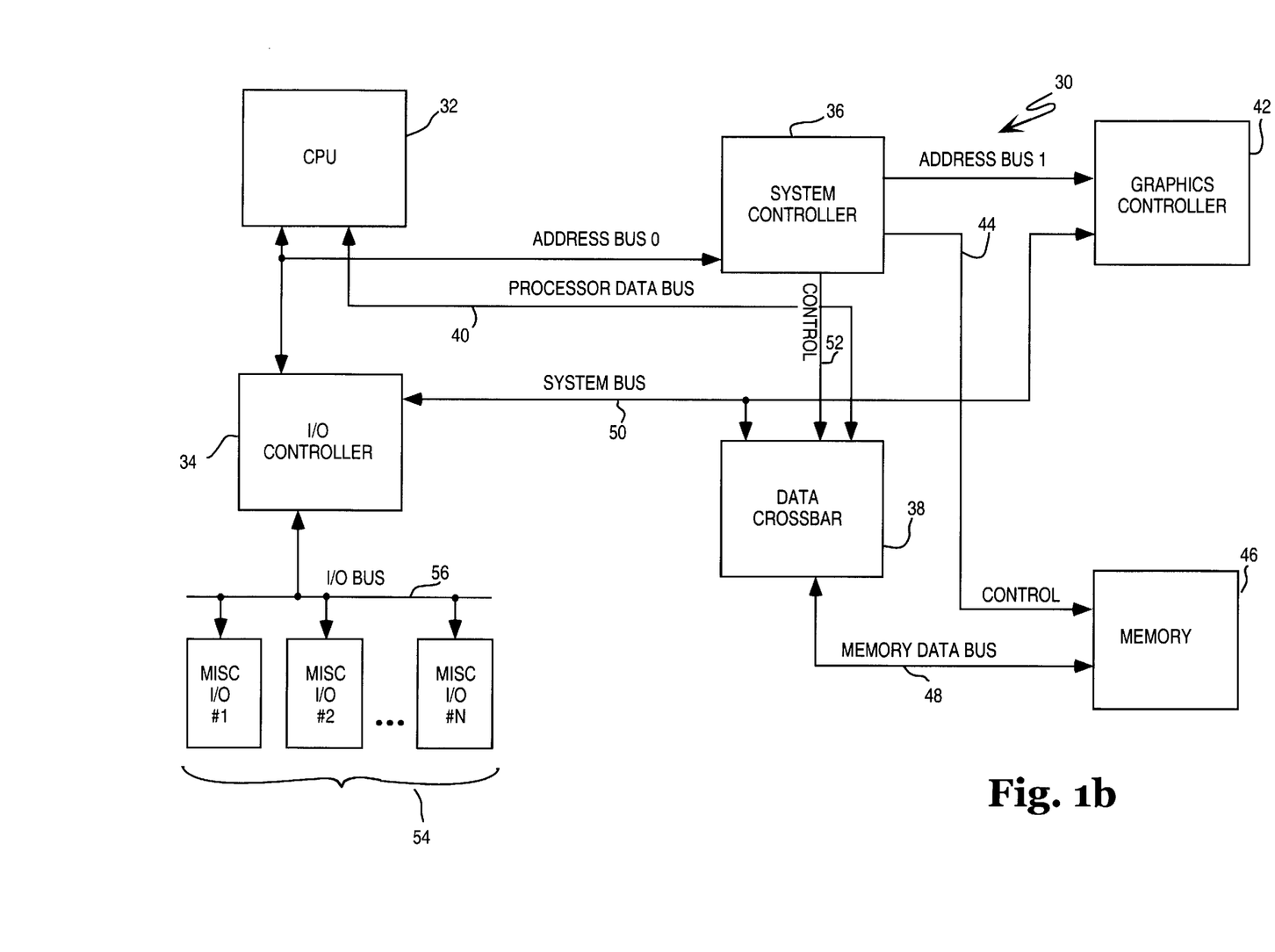
FIG. 1b is a system block diagram of another exemplary processor system in which the program counter age bits of the present invention are used.

FIG. 1b is a system block diagram of another exemplary processor system in which the program counter age bits of the present invention are used. FIG. 1b illustrates a processor system 30 which includes CPU 32, such as an UltraSPARC microprocessor. CPU 32 is coupled to I/O Controller 34, System Controller 36 and Data Crossbar 38. CPU 32 communicates bidirectionally with System Controller 36 via Address Bus O and with Data Crossbar 38 via Processor Data Bus 40. Control of the Data Crossbar 38 is provided by System Controller 36. System Controller 36 is also coupled to Graphics Controller 42 via Address Bus 1 and to Memory 46 via signal line 44. Memory 46 communicates bi-directionally with Data Crossbar 38 via Memory Data Bus 48. Data Crossbar 38 is a switching mechanism for switching access of N sources or inlets to any of M sinks or outlets as is known in the art. In the present example, Data Crossbar 38 facilitates the switching access of CPU 32, I/O controller 34, Graphics Controller 42 and Memory 46 to any of CPU 32, I/O Controller 34, Graphics Controller 42 and Memory 46. Control of the Data Crossbar 38 is provided by System Controller 36 via signal line 52. The processor system 30 may also include various I/O and peripheral modules (i.e., MISC I/O #1, MISC I/O #2, . . . , MISC I/O #N) 54, which are coupled along I/O bus 56. In a preferred embodiment, an UltraSPARC Port Architecture ("UPA") bus, as specified in the UltraSPARC User's Manual, is used as System Bus 50 and an S-Bus, as specified in the Institute of Electronics and Electrical Engineering ("FEEE") Standard 1496 specification, is used as I/O Bus 56.

Figure 2A:
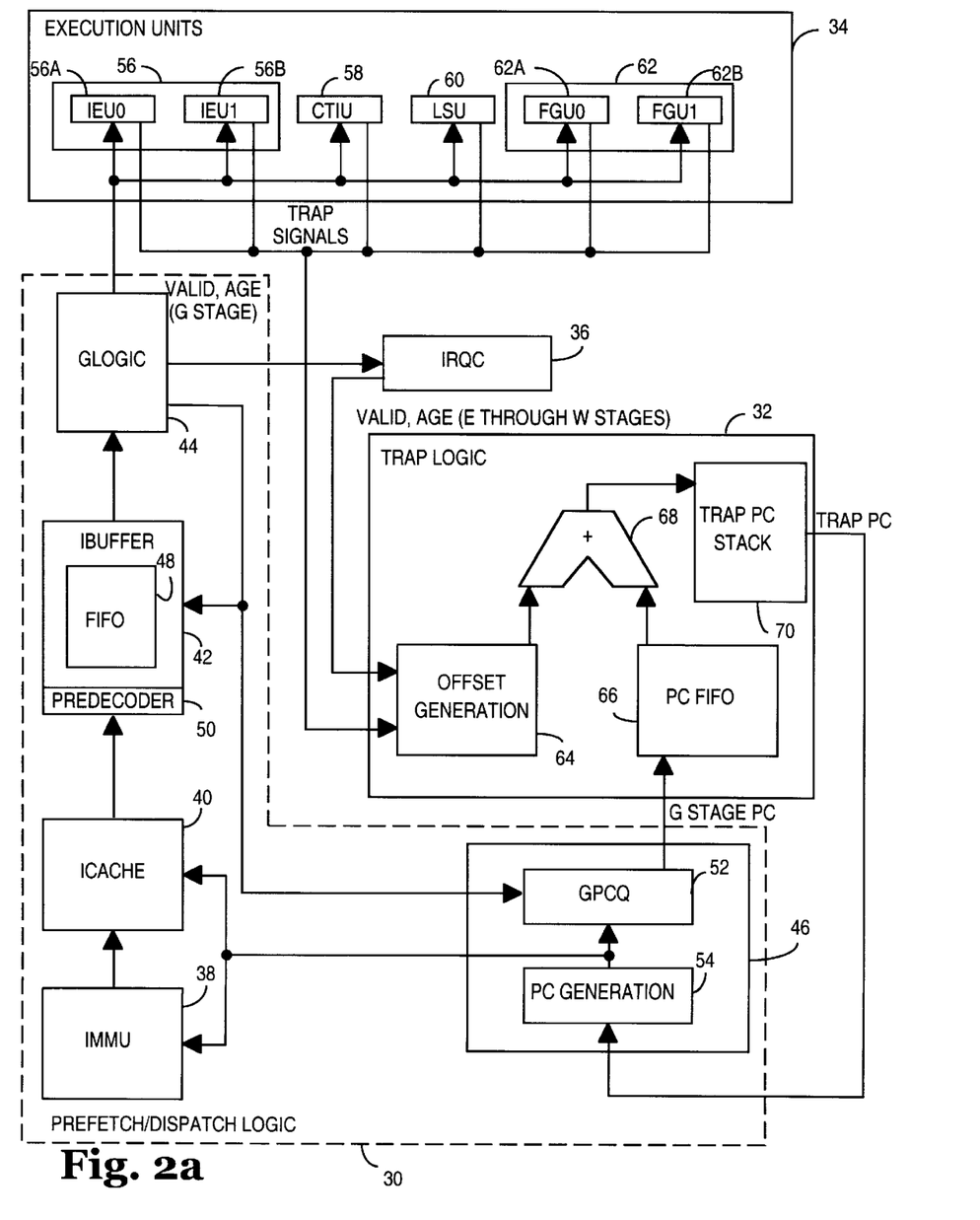
FIG. 2a is a block diagram illustrating the apparatus of the present invention in the processor system in FIG. 1.
Figure 2B:
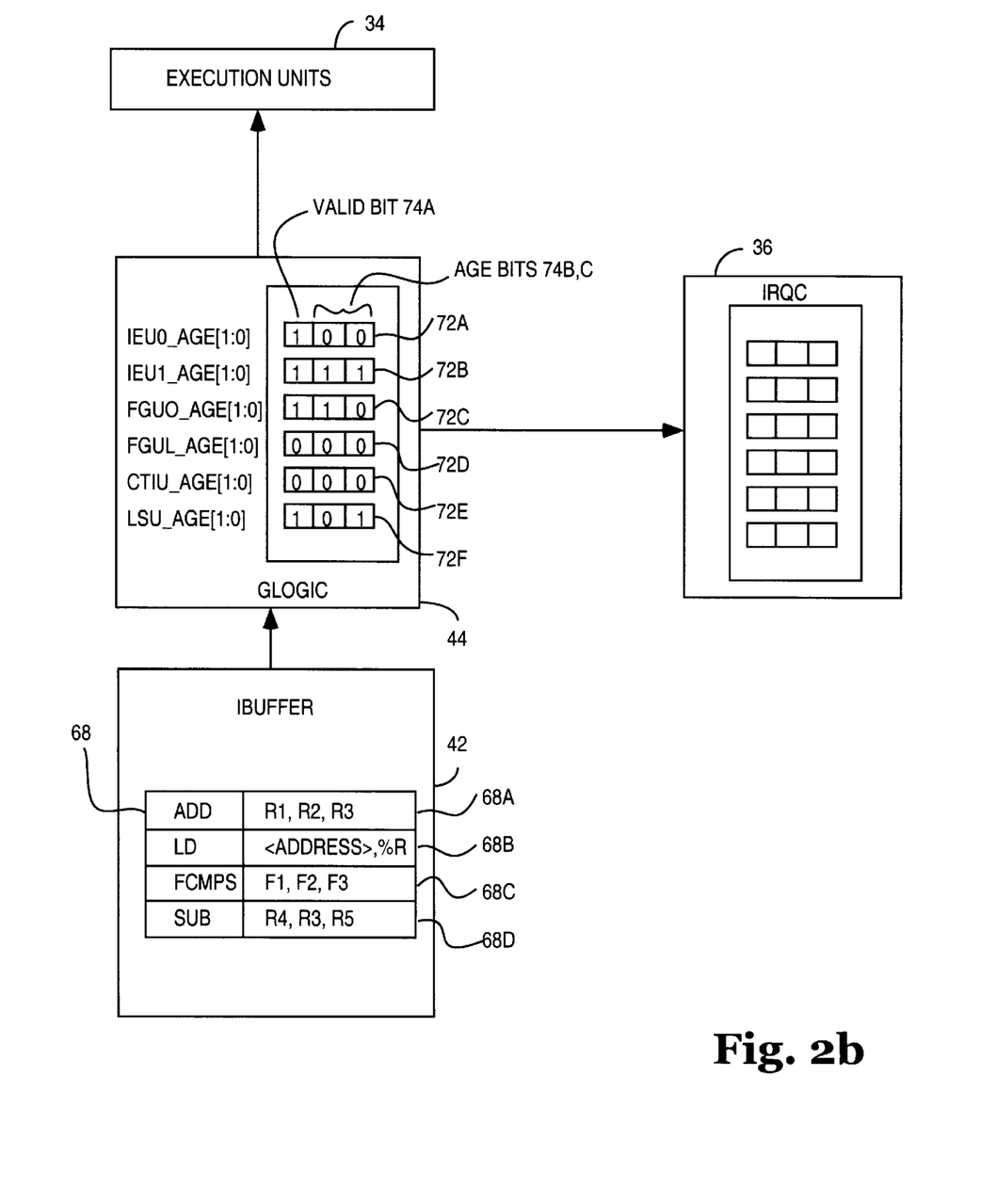

FIG. 2a is a block diagram of a preferred embodiment of the CPU 12 (FIG. 1) of the present invention. The CPU 12 comprises Prefetch/Dispatch Logic ("PDL") 30, Trap Logic 32, a plurality of Execution Units ("EU") 34, and an Instruction Register Queue Control circuit (IRQC) 36. FIG. 2b is a detailed block diagram of a portion of the Prefetch/Dispatch Logic 30 depicted in FIG. 2a.

With reference to FIG. 2a, the PDL 30 comprises an Instruction Memory Management Unit ("IMMU") 38, an Instruction Cache ("ICache") 40, an Instruction Buffer ("IBuffer") 42, Grouping Logic ("GLogic") 44 and a Program Counter ("PC") 46. The IBuffer 42 comprises a 12-deep "First In First Out" instruction buffer (FIFO) 48 and a predecoder 50. The PC 46 comprises a Grouping stage Program Counter Queue (GPCQ) 52 and a PC Generation Logic 54. The PC 46 is a register that holds the address of the program instruction to be executed. The PC 46 goes through a counting sequence and causes the computer to read sequential instructions previously stored in memory. The GPCQ 52 is a buffer for storing the addresses of instructions which have been fetched from the ICache 40 into the IBuffer 42. The PC Generation logic 54 generates the instruction addresses required for each stage of instruction processing. At the point instructions are dispatched by GLogic 44, the "oldest" address in GPCQ 52 moves into the PC FIFO 66 in Trap Logic 32, as will be described in detail in the following sections.

The IMMU 38 manages the instruction memory of the processor 12 and controls the operation of the ICache 40. ICache 40 delivers up to four instructions per clock cycle along a predicted path of execution, and provides these instructions to the Predecoder 50 in the IBuffer 42 for decoding. The decoded instructions are then stored in the FIFO 48 in the IBuffer 42. GLogic 44 directs the instructions given to the processor 12 as shown in FIG. 1 to one of the six execution units 34. In a preferred embodiment, GLogic 44 contains a set of six three-bit registers 72a–72f (see FIG. 2b). Each of the registers 72a–72f is associated with a particular execution unit 34 and is set by GLogic 44 when an instruction is directed by GLogic 44 to one of the execution units 34, as will be described in detail in the following sections. The first bit in all six registers 72a–72f is a valid bit and the following two bits are the age bits. GLogic 44 also sends a count of the number of dispatched instructions to GPCQ 52 and IBuffer 42 for record keeping.

The present invention utilizes the age bits to represent the relative age of a particular instruction within a set of instructions. In the present preferred embodiment, the set comprises four instructions. As GLogic 44 directs an instruction into one of the six execution units 34, it sets the valid bit corresponding to each instruction, indicating that the data sent is actually a real instruction. This information is used in the Trap Logic 32, where all interrupts and exceptions are processed and prioritized, as will be described in detail below.

In a preferred embodiment, the Execution Units 34 include an Integer Execution Unit ("IEU") 56, a Control Transfer Instruction Unit ("CTIU") 58, a Load/Store Unit (LSU) 60 and a Floating-Point/Graphics Unit (FGU) 62 as shown in FIG. 2a.

The IEU 56 is the main execution unit responsible for integer arithmetic and pipeline control. It comprises two arithmetic logic units IEU0 56a and IEU1 56b, each of which performs integer arithmetic, logical and shift operations. The IEU 56 also has a register file (not shown). The CTIU 58 processes CTIs which include PC-relative branches and calls, register-indirect jumps and conditional traps. The LSU 60 executes all instructions that transfer data between the memory hierarchy and the two execution units, the IEU 56 and FGU 62. The FGU 62 comprises two functional units FGU0 62a and FGU1 62b and a register file (not shown). Each functional unit FGU0 62a and FGU1 62b performs floating-point addition, floating point multiplication and floating point division. They also perform the graphics addition and multiplication of the processor.

The IRQC 36 maintains all the valid bits 74a and age bits 74b, 74c for the Execution through Write stages of the pipeline. The Trap Logic 32 comprises an Offset Generation Unit 64, a PC FIFO 66, an Adding Unit 68 and a Trap PC Stack 70. The Offset Generation Unit 64 generates the offsets for maintaining the instruction address. The offset thus generated is combined with the instruction address retrieved from the PC FIFO 66 and the resulting trap instruction address is stored in the Trap PC Stack 70.

For purposes of illustration, FIFO 68 of IBuffer 42 is shown in FIG. 2b to hold a set of four instructions 68a–68d, where instruction 68a is the first or "oldest" instruction and instruction 68d is the most recent or "youngest" instruction. Each of these instructions 68a–68d are provided to GLogic 44, which dispatches the instructions 68a–68d to their predetermined destinations within the block of execution units 34 all within the same clock cycle. Specifically, the first instruction 68a, which is an addition function, will be dispatched to IEU0 56a; the second instruction 68b, which is a load function, will be dispatched to LSU 60; the third instruction 68c, which is a floating point comparison function 68c, will be dispatched to FGU0 62a and the last instruction 68d will be dispatched to IEU1 56b. As described earlier, GLogic 44 also comprises a set of six three-bit registers 72a–72f. Each of the registers 72a–72f is associated with a particular execution unit 34 and is set by GLogic 44 when an instruction is directed by GLogic 44 to one of the execution units 34. For example, the first register 72a is associated with LEU0 56a; the second register 72b is associated with IEU1 56b; the third register 72c is associated with FGU0 62a; the fourth register 72d is associated with FGU1; the fifth register 72e is associated with CTIU 58 and the last register 72f is associated with LSU 60.

The first bit 74a in all six registers 72a–72f is a valid bit and the following two bits are the age bits 74b and 74c. Age bit 74b is the most significant bit while age bit 74c is the least significant bit. Together, age bits 74b and 74c represent the order of an instruction with respect to the first instruction within a group of instructions. The valid bit 74a is set by GLogic 44 to indicate that the data dispatched to a particular execution unit 34 is a valid instruction. This procedure is implemented to validate and prioritize the PC offsets utilized in the present invention, as will be described in detail in the following sections. The age bits 74b and c are set by GLogic 44 in accordance with the chronological age of the instructions 68 received. As known in the technology, the bits stored in 74b and 74c represent binary digits. For example, as instruction 68a is being dispatched to IEU0 56a, the valid bit 74a in register 72a is set to 1 and age bits 74b and 74c in register 72a are set to 00. The age bits 74b and 74c in register 72 indicate that instruction 68a is the oldest or first instruction received among the set of four instructions in FIFO 68. When instruction 68b is dispatched to LSU 60, the valid bit 74a in register 72f is set to a 1 and the age bits 74b and 74c in register 72f are set to 01. As instruction 68c is dispatched to FGU0 62a, the valid bit 74a in register 72c is set to a 1 and the age bits 74b and 74c in register 72c are set to 10 (binary two). Finally, as instruction 68d is dispatched to IEU1 56b, the valid bit 74a in register 72b is set to a 1 and the age bits 74b and 74c are set to 11 (binary three). The valid and age bits 74a, 74b and 74c respectively of the other two registers 72d and 72e will remain at 000 since the associated execution units FGU1 62b and CTIU 58 will remain idle during this cycle. The contents of register 72 are provided to IRQC 36 during the next clock cycle, as will be described in detail below.

Figure 3:
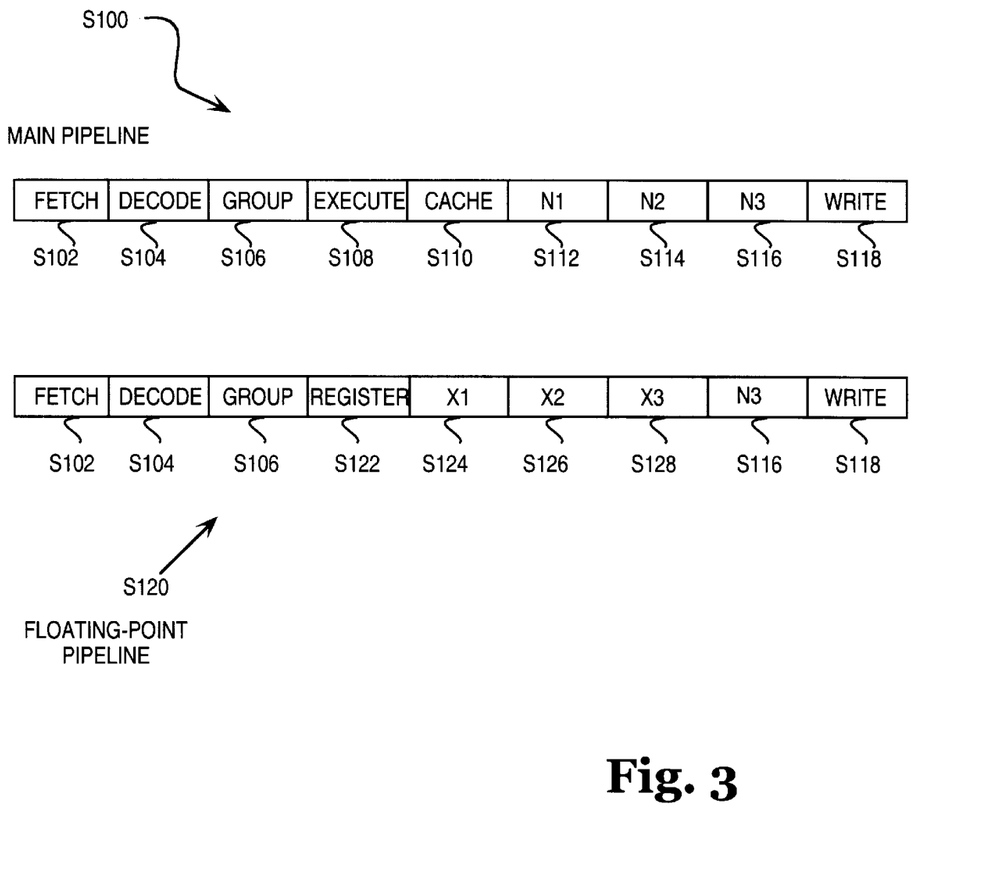
FIG. 3 illustrates a nine-stage pipeline utilized in a preferred embodiment of the present invention.

The present invention will also be discussed in reference to a nine-stage pipeline S100 as illustrated in FIG. 3. As known in the technology, pipelining is a technique of decomposing a sequential process into subprocesses with each subprocess being executed in a special dedicated segment that operates concurrently with all other segments. A pipeline may be considered as a collection of processing segments through which binary information flows. Each segment performs a partial processing dictated by the way the task is partitioned. The result obtained from the computation in each segment is transferred to the next segment in the pipeline. The final result is obtained after the data has passed through all segments. The series of processing steps associated with integer processing as initiated by the IEU0 56a or IEU1 56b is called the Integer pipeline, while the series of processing steps for floating point calculations as initiated by the FGU0 or FGU1 is called a Floating Point Pipeline. The various processing pipelines do not necessarily utilize the same process steps or pipeline stages, since their functions are different, as will be discussed in the following sections.

The main pipeline S100 illustrated in FIG. 3 comprises nine stages: the fetch S102, decode S104, group S106, execute S108, cache S110, N1 S112, N2 S114, N3 S116 and write ("W") S118 stages. It is understood however, that fewer or a greater number of pipeline stages may be utilized in implementing the present invention. Most of the pipelines, such as the Integer pipeline, are modeled after the main pipeline S100. The Floating Point pipeline S120, however, differs slightly from this model, as will be discussed in the following sections.

For discussion purposes, the process steps or stages in an Integer pipeline will be discussed with reference to FIG. 2a and FIG. 2b and the Main pipeline S100 shown in FIG. 3. In the fetch stage S102, the set of four instructions 68a–68d is read from ICache 40 and provided to predecoder 50. In the decode stage S104, these instructions 68a–68d are further decoded and placed in the 12-entry FIFO 48 in IBuffer 42 which decouples instruction fetching from execution. In the Group stage S106, the IEU0 56a and IEU1 56b are accessed at the same time as the four oldest entries in the FEFO 48 of IBuffer 42 are considered for dispatch. All register dependencies (e.g., read-after-write hazard) and resource conflicts (e.g., not enough integer pipelines) are resolved during this stage. Instructions not "consumed" in a given cycle are recirculated in the IBuffer 42.

At this point, the Integer pipeline S100 and Floating-point/Graphics pipeline S120 differ. The next stage in the Integer pipeline S100 is the execution stage S108, where all integer instructions are executed and virtual addresses are calculated. The integer pipelines are not identical; in particular, shifts and condition code setting instructions can only be executed in one of the pipelines.

During the cache stage S110, the data cache (not shown) and the data in the Translation Lookaside Buffer ("TLB") (not shown) are accessed using the virtual address. Branches are resolved in this stage. In the N1 stage, data cache misses are detected and load data is available from cache hits. Accesses that miss the data cache are queued on the load buffer. In the N2 stage S114, processes for the Integer pipeline S100 are stalled while the Integer pipeline S100 waits for the Floating-point pipeline S120. In the N3 stage S116, the two pipelines converge and all traps are resolved. In the write stage S118, results are written back to IEU 56 and FGU 62 and the results are processed.

Like integer instructions, floating-point instructions are dispatched in the group stage S106. However, in place of the execution stage S108, the floating point pipeline utilizes a register stage S122. In the register stage, additional instruction decoding is done and the floating-point register file is accessed, one cycle after the integer register file is accessed. The floating point pipeline S120 then proceeds to the X1 S124, X2 S126 and X3 S128 stages which correspond to stages S112–S114.

To track and maintain the addresses associated with the group of instructions 68a–68d as shown in FIG. 2b, the present invention utilizes the age bits 74b and 74c to calculate the address offsets of the group of instructions with respect to the address of the first instruction 68a in the group. The valid bit 74a is used to verify the validity of the instructions as they are propagated down a pipeline. As a result, addresses in the instruction group can be efficiently tracked, the correct address for processing the trap may be efficiently stored and program execution may resume following completion of trap processing.

More particularly, the present invention utilizes the valid and age bits 74a, 74b and 74c to represent the relative age of an instruction 68a, 68b, 68c or 68d within the group of instructions 68a–68d. A set of age bits is associated with each of the instructions stored in the execution units, namely the IEU0 56a, IEU1 56b, CTIU 58, LSU 60, FGU0 62a and FGU1 62b. In any given clock cycle, four instructions can be active, each for processing by one of the six execution units 34. Thus, there can be four instructions being executed along four of the six pipelines. The age bits indicate the relative age of an instruction within a set of four instructions being executed in a given pipeline stage. There are 2 age bits per pipeline, for a total of twelve bits for the six execution processing pipelines. During the Group stage S106, the GLogic steers the instructions into the appropriate execution units 34. In conjunction with this task, a valid bit corresponding to each instruction is set when an instruction is sent to a particular execution unit, indicating that data sent is a valid instruction. This information is used in the Trap Logic 32, where all interrupts and exceptions are processed and prioritized during the N3 stage S116.

Figure 4:
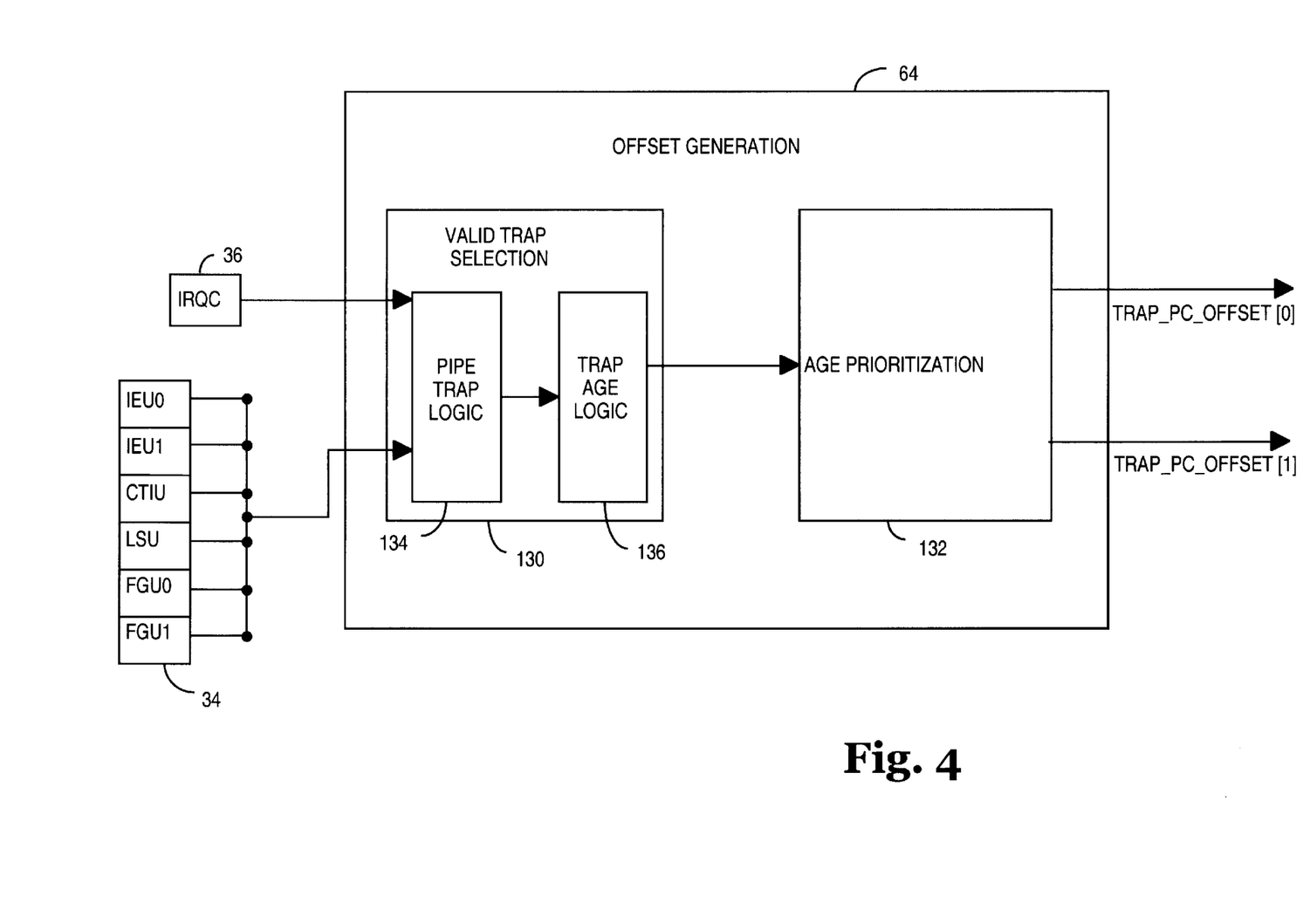
FIG. 4 is a detailed block diagram of the Offset Generation Unit illustrated in FIG. 2.

FIG. 4 is a block diagram of the Offset Generation Unit 64. The Offset Generation Unit comprises a Valid Trap Selection Unit 130 and an Age Prioritization Unit 132. Trap signals from the six execution units 34 are provided to the Valid Trap Selection Unit 130. The valid bit 74a and age bits 74b and 74c are also provided by the IRQC 36 to the Valid Trap Selection Unit 130 in Offset Generation Logic 64.

As described earlier, traps are detected near the last stage of the execution right before the results are written back. In addition, a trap can occur for any of the four instructions in the group 68a–68d. If, for example, the youngest instruction 68d in the group takes the exception, the address for the instruction has to be stored so that the correct address for processing the trap may be recorded and so program execution may be resumed following completion of trap processing.

Thus, whenever an exception occurs for any of the four instructions 68a–68d, the execution unit 56a, 56b, 58, 60, 62a or 62b associated with the instruction will send a trap signal to the Valid Trap Selection circuit 130. At the same time, the IRQC 36 shifts the valid and age bits 74a, 74b and 74c into the Valid Trap Selection circuit 130. The Valid Trap Selection circuit 130 comprises a Pipeline Trap Logic circuit 134 and a Trap Age Logic circuit 136. The Valid Trap Selection circuit 130 verifies that the signals received are valid and provides the validated trap signals to an Age Prioritization circuit 132 so that address offsets for the trap signals may be generated, as will be described in detail in the following sections.

Figure 5:
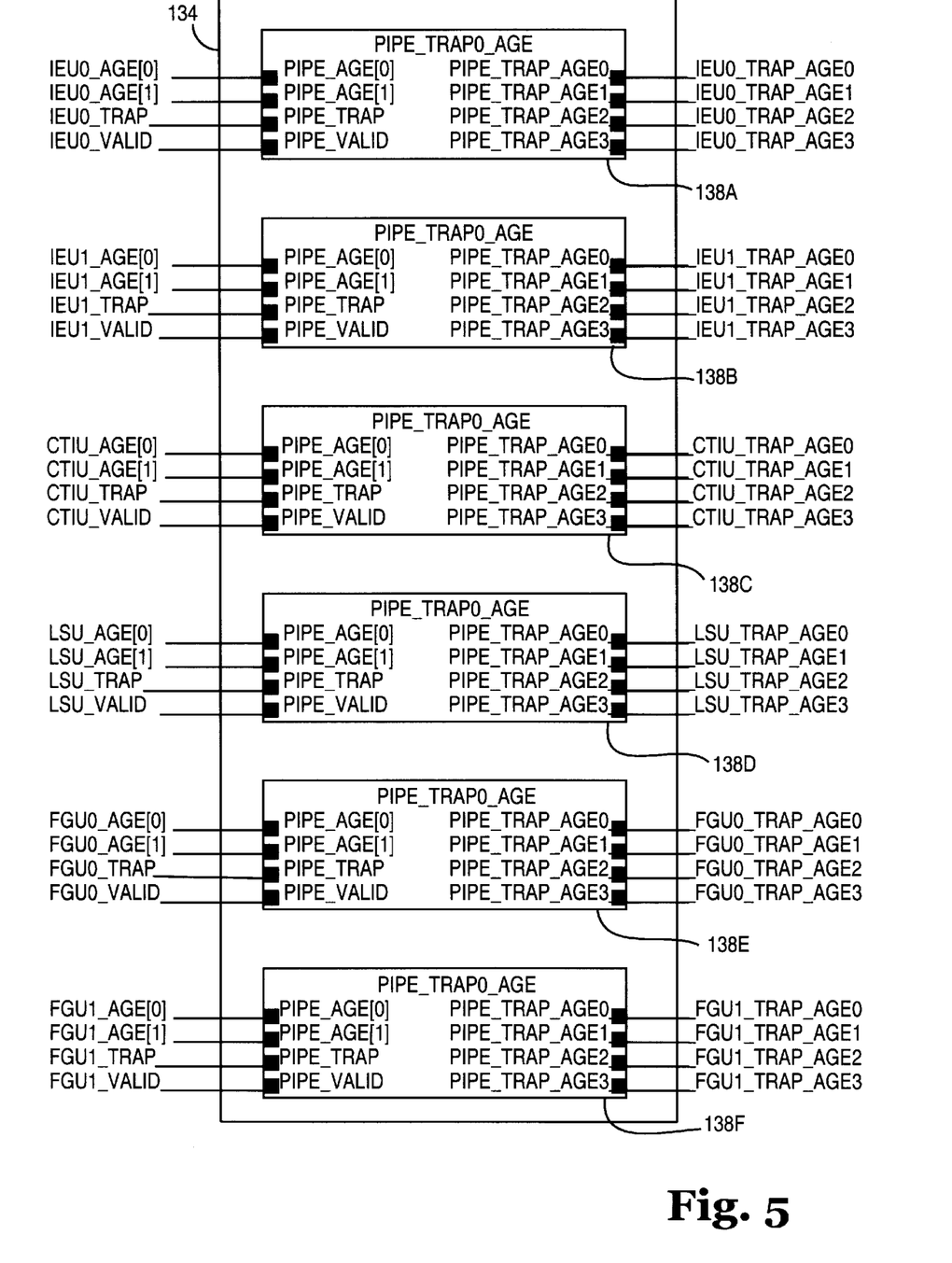
FIG. 5 is a detailed block diagram of the Valid Trap Logic illustrated in FIG. 4.

FIG. 5 is a detailed block diagram of the Pipeline Trap Logic circuit 134 of FIG. 4. The Pipeline Trap Logic circuit 134 comprises six identical circuits 138a–138f. As shown, the valid and age bits 74a, 74b and 74c associated with the instruction 68a, 68b, 68c or 68d are forwarded from the IRQC 36. The trap signal generated by a particular execution unit 34 is forwarded to a Pipeline Trap Logic circuit 138a, 138b, 138c, 138d, 138e or 138f associated with the execution unit 34. For instance, the age bits 74b (ieu0_age[1]) and 74c (ieu0_age[0]) associated with the instruction 68a, the trap signal ieu0_trap, and the valid bit 74a (ieu0_valid) associated with instruction 68a are dispatched to the circuit 138a in Pipeline Trap Logic circuit 134. In response, the circuit 138a provides the chronological age of the trap signal received, with respect to the trap signals received from IEU0 56a. The four outputs of circuit 138a are ieu0_trap_age0, ieu0_trap_age1, ieu0_trap_age2, ieu0_trap_age3. Since instruction 68a is the oldest instruction in the group of four instructions 68a–68d, only ieu0_trap_age0 will be provided as a logical 1, while the remaining three outputs, ieu0_trap_age1, ieu0_trap_age2, ieu0_trap_age3 will remain at a logical zero. The circuits 138a–138f are identical and a set of trap age signals are thus generated for each of the six pipelines. For discussion purposes, each of the circuits 138a–138f will be referred to as circuit 138.

Figure 6A:
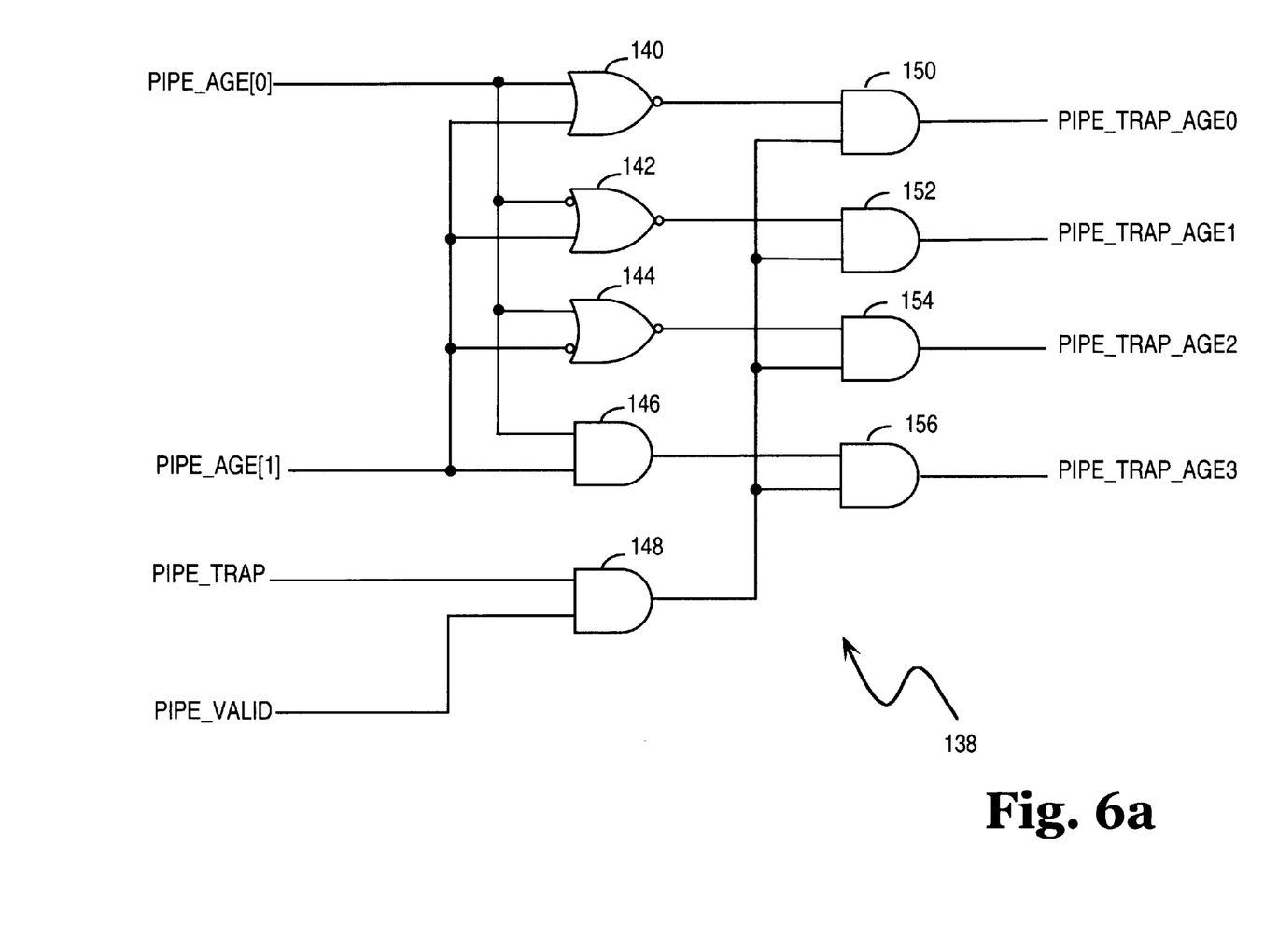
FIG. 6a is a detailed schematic diagram of the Valid Trap Logic circuit of FIG. 5.

FIG. 6a is a detailed schematic diagram of the Pipeline Trap Logic circuit 138 of FIG. 5. As shown, a signal representing the second or least significant age bit 74c (pipe_age[0]) associated with a particular execution unit 34 is provided to NOR gates 140, 144 and AND gate 146. This signal is also inverted and then provided to NOR gate 142. Similarly, a signal representing the first or most significant age bit 74b (pipe_age[1]) associated with the same execution unit 34 is provided to NOR gates 140, 142 and AND gate 146. This signal is also inverted and provided to NOR gate 144. The signals representing the trap signal (pipe_trap) and valid bit 74a (pipe_valid) associated with the execution unit 34 are provided as inputs to AND gate 148. The outputs of gates 140, 142, 144 and 146 are provided as one input to AND gates 150, 152, 154 and 156, respectively. The output of gate 148 is provided as a second input to gates 150, 152, 154 and 156, respectively. Gates 150, 152, 154 and 156 provide the trap age signals pipe_trap_age0, pipe_trap_age1, pipe_trap_age2, pipe_trap_age3 in response.

Thus, if instruction 68b in the set of instructions 68a–68d shown in FIG. 2b takes a trap, circuit 138d will receive the valid and age bits associated with the instruction 68b, which are 1, 0, 1, respectively and a logical 1 trap signal from LSU 60 of FIG. 2a. The trap signal is shown as pipe_trap in FIG. 6a. With reference to FIG. 6a, these signals are provided to the circuit 138. Thus, the signals pipe_age[0], pipe_age[1], pipe_trap and pipe_valid, as provided to circuit 138, are 1, 0, 1, 1, respectively. The corresponding outputs of gates 140, 142, 144, 146 and 148 are logical 0, 1, 0, 0 and 1 respectively. These signals are provided to gates 150, 152, 154 and 156, which output logical 0, 1, 0 and 0 respectively. In this case, only pipe_trap_age1 is a logical 1, indicating that the second instruction 68b in the set 68a–68d (as shown in FIG. 2b) has taken a trap.

Figure 6B:
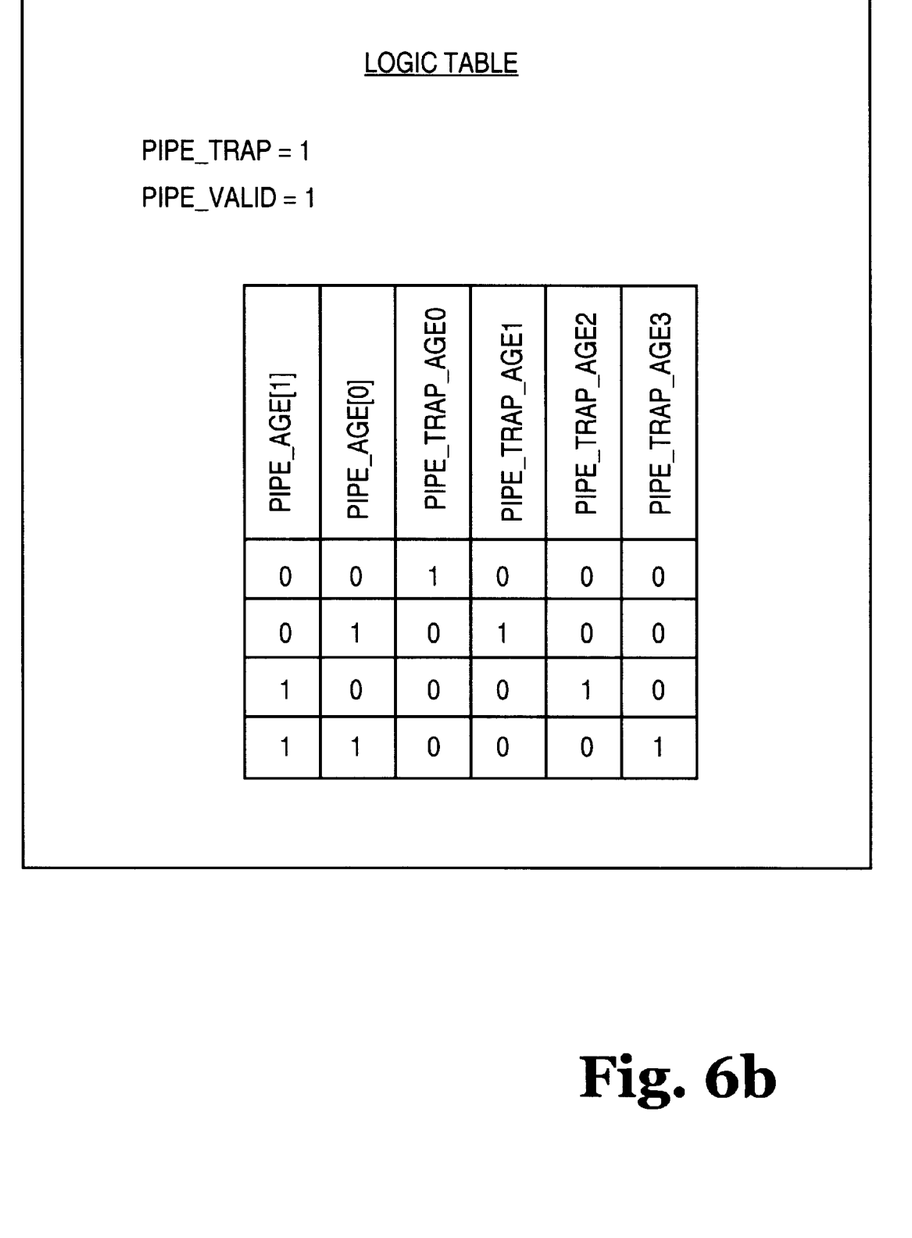

FIG. 6b is a logic table which illustrates the status of the outputs of circuit 138, namely pipe_trap_age0, pipe_trap_age1, pipe_trap_age2 and pipe_trap_age3, when the circuit 138 of FIG. 6a is provided with various combinations of inputs. When pipe_trap and pipe_valid signals are both at a logical 1, any one of the four outputs of circuit 138 may be active. When pipe_age[1] and pipe_age[0] are each provided with a logical 0, the signal represented by pipe_trap_age0 will be a logical 1, while the other outputs remain at a logical 0. When pipe_age[1] and pipe_age[0] are provided with 0 and 1 respectively, the signal represented by pipe_trap_age1 will be a logical 1, while the other outputs remain at a logical 0. When pipe_age[1] and pipe_age[0] are provided with 1 and 0 respectively, the signal represented by pipe_trap_age2 will be a logical 1 while the other outputs remain at logical 0. Finally, when pipe_age[1] and pipe_age[0] are each provided with a logical 1, the signal represented by pipe_trap_age3 will be a logical 1 while the other outputs remain at a logical 0. The address offsets of instructions as represented by the age bits provided on pipe_age[1] and pipe_age[0] are thus propagated to the Trap Age Logic circuit 136 of FIG. 4 when a valid instruction has taken a trap. If either pipe_trap or pipe_valid is a logical 0, all outputs of circuit 138 will be zero.

Figure 7:
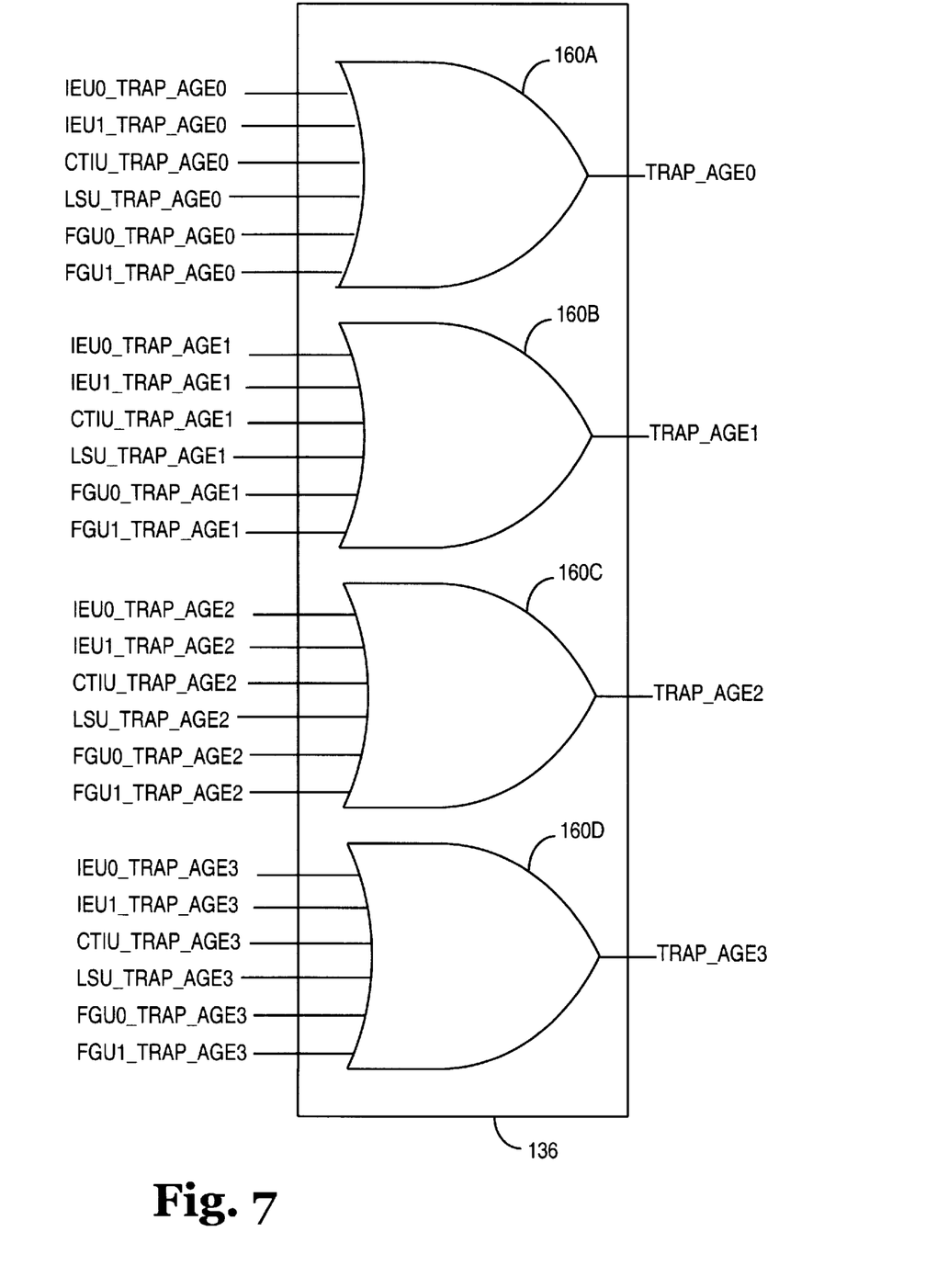
FIG. 7 is a detailed schematic diagram of the Valid Trap Selection Logic illustrated in FIG. 4.

FIG. 7 is a detailed schematic diagram of the Trap Age Logic circuit 136 of FIG. 4, which comprises four OR gates 160a–160d. Each OR gate 160a–160d receives an input from each of the circuits 138a–138f. For example, OR gate 160a receives the oldest trap age signals from IEU0, IEU1, CTIU, LSU, FGU0 and FGU1 as shown in FIG. 2. Thus, if any one of these signals is high (or a logical 1), OR gate 160a will provide a logical 1 signal. Thus, in the example cited earlier, lsu_trap_age1 will provide a logical 1 to gate 160b, which outputs a logical 1.

Figure 8A:
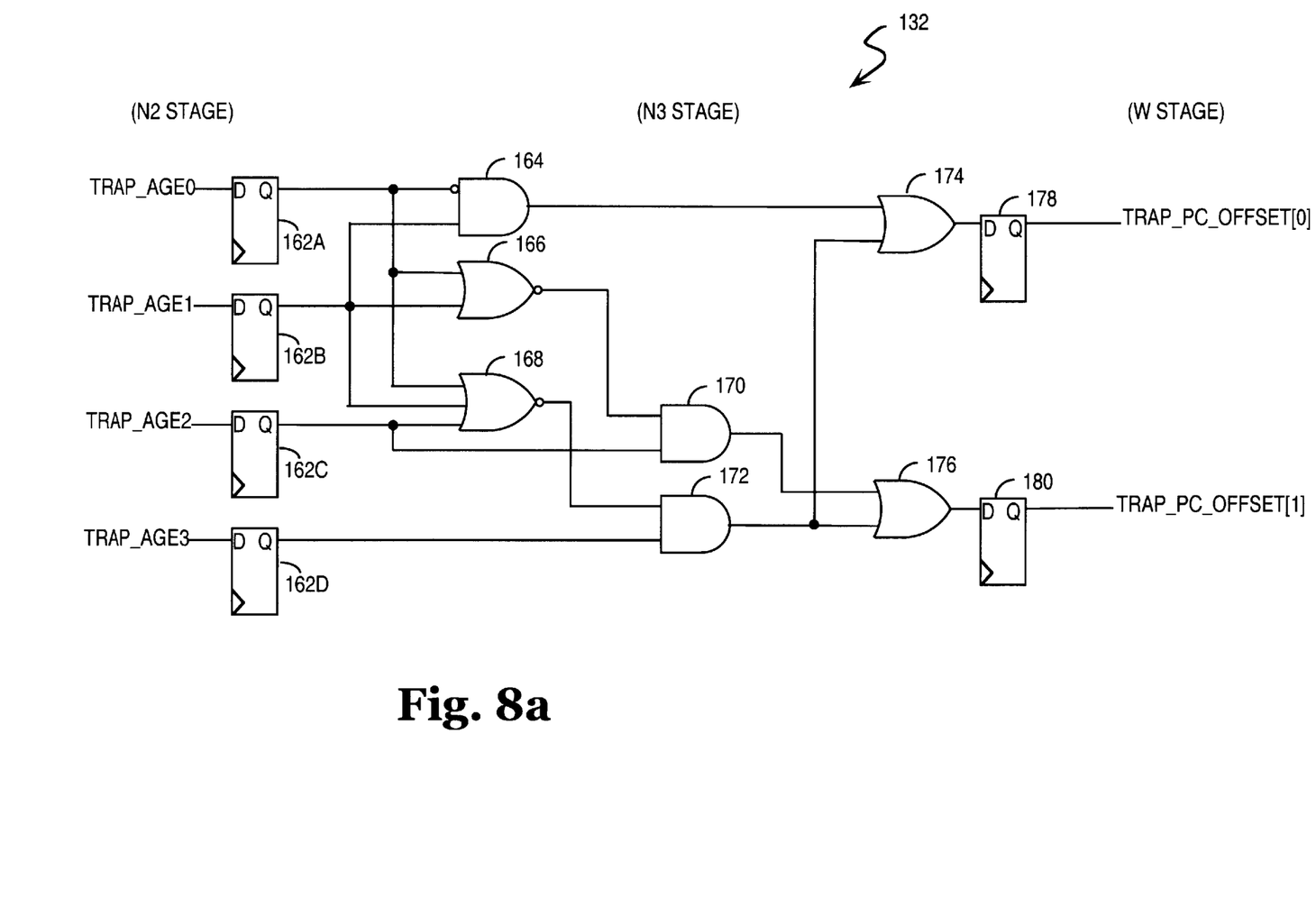
FIG. 8a is a detailed schematic diagram of the age Prioritization Logic illustrated in FIG. 4.

FIG. 8a is a detailed schematic diagram of the Age Prioritization circuit 132 of FIG. 4. The Age Prioritization circuit 132 receives the four signal lines trap_age0, trap_age1, trap_age2 and trap_age3 from the circuit 136 during the N2 stage of a pipeline. As discussed earlier, in the N2 stage, processes for the pipeline S100 are stalled while the integer pipeline S100 waits for completion of processing of the floating point pipeline S120 as shown in FIG. 3. Each of the trap_age signals are provided to a respective latch circuit (D flip flop) 162a–162d of FIG. 8a. The outputs of the latch circuits 162a–162d are provided to various gates during the N3 stage of a pipeline, where the integer pipeline S100 and floating point pipeline S120 converge as shown in FIG. 3. The output of latch circuit 162a is inverted and then provided as one input to AND gate 164, but is also provided directly as one input to each NOR gate 166 and 168. The output of latch circuit 162b is provided as one input to AND gate 164 and as one input to each NOR gate 166 and 168. The output of latch circuit 162c is provided as a third input to NOR gate 168. The output of NOR gate 166 and the output of latch circuit 162c are provided as inputs to AND gate 170. Similarly, the output of NOR gate 168 and the output of latch circuit 162d are provided to AND gate 172. The outputs of gates 164 and 172 are provided as inputs to OR gate 174. Similarly, the outputs of AND gates 170 and 172 are provided as inputs to OR gate 176. The outputs of OR gates 174 and 176 are provided to latching circuits 178 and 180 respectively, which then generate the PC offset bits, trap_pc_offset[0] and trap_pc_offset[1] during the W stage of the pipeline, when the results are provided back to the processor. Trap_pc_offset[0] and trap_pc_offset[1] are respectively the least and most significant bits of the address offset of an instruction.

Using the example cited earlier, the inputs to latching circuits 162a, 162b, 162c and d are 0, 1, 0 and 0 respectively. When latched into the latching circuits 162a, 162b, 162c and 162d, the first three of these signals are provided to gates 164, 166, 168, which output 1, 0 and 0 respectively. In the N3 stage, gates 170 and 172 provide output signals 0 and 0, which are provided to gate 176. The outputs of gates 164 and 172 which are 1 and 0, respectively, are provided to gate 174. Gates 174 and 176 output a logical 1 and 0, respectively, which are provided to latching circuits 178 and 180 respectively. The trap_pc_offset bits as provided on trap_pc_offset[1] and trap_pc_offset[0] are 0 and 1, respectively. Thus, the address offset of the instruction which has taken a trap is maintained through the offset generation circuit 64 and added to the address provided from PC FIFO 66 of FIG. 2A and the results are stored in Trap PC stack 70 of FIG. 2A. The address of the instruction which has taken a trap is provided to the PC 46 so that the processor 12 may return to the point of interruption in the address stream and resume processing the instructions when processing of the trap is complete.

Figure 8B:
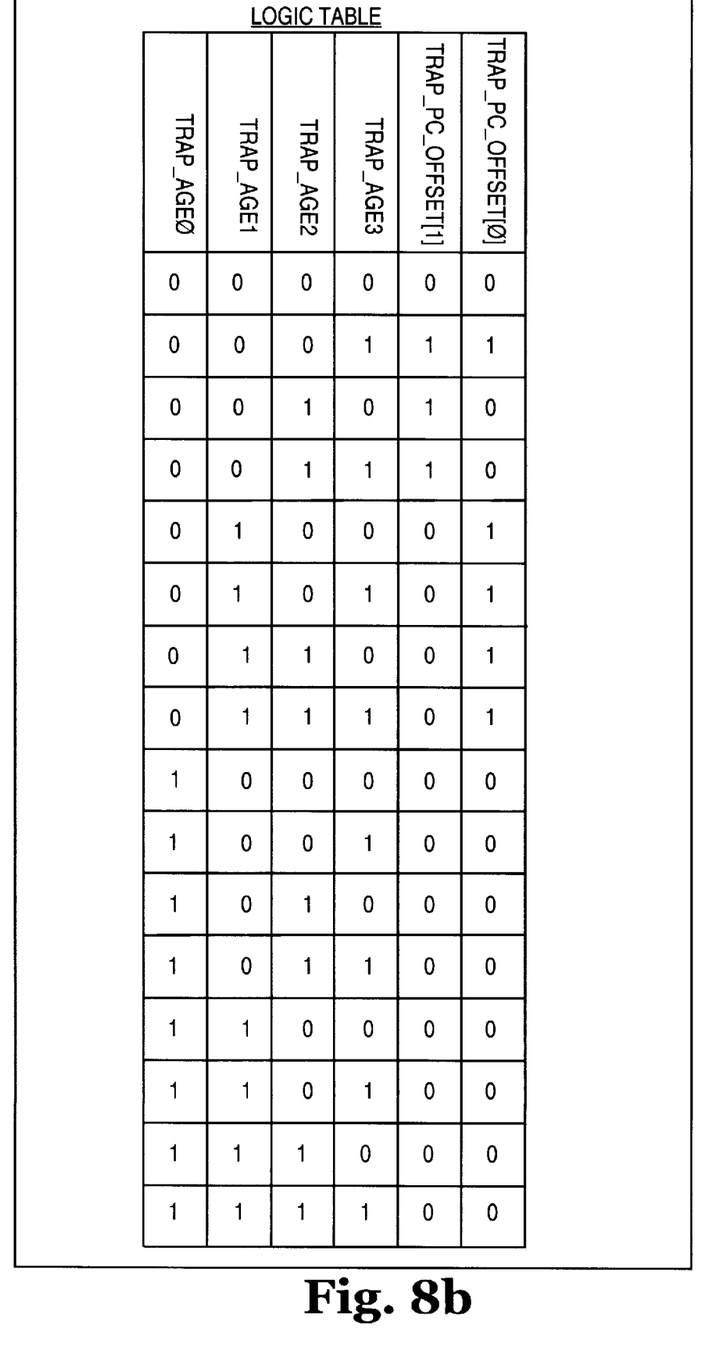

FIG. 8b is a logic table which illustrates the status of the outputs of the Age Prioritization circuit 132 of FIG. 4 and FIG. 8a when different combinations of inputs are clocked through the circuit 132. Note that there can be more than one instruction within a group that is taking a trap, thus, more than one trap_age signal can be active. However, Age Prioritization Logic 132 is a priority encoder and it provides an output that is based on the oldest active instruction. As shown in FIG. 8b, when only trap_age0 is at a logical 1, the output of circuit 132 as represented by trap_pc_offset[1] and trap_pc_offset[0] is 00. This will always be true even if any of trap_age1, trap_age2 or trap_age3 is at a logical 1, since the oldest trap represented by trap_age0 has to be attended to first. When trap_age1 is at a logical 1, and trap_age0 is at a logical 0, the output of circuit 132 is 01.

This will always be true even if either trap_age2 or trap_age3 is at a logical 1, since the oldest trap in this situation, as represented by trap_age1, has to be attended to. When trap_age2 is at a logical 1, trap_age0 and trap_age1 are at a logical 0, the output of circuit 132 is 10 (binary two). This is true even if trap_age3 is at a logical 1 since trap_age2 represents the oldest trap in this situation. Finally, when only trap_age3 is at a logical 1, the output of circuit 132 is 11 (binary three). In this manner, the address offsets of instruction within a set are tracked during pipeline processing.

Once the age of the oldest trapping instruction within a group has been calculated, in addition to calculating and storing the address of the trapping instruction, Trap Logic 32 dispatches the calculated information to IRQC 36. The IRQC 36 uses it to disable the W stage valid bit 74a of the trapping instruction and any younger instructions in the group. This prevents them from completing (i.e., writing their results to the register file). Upon completion of the trap processing, the address stored in the PC Trap Stack 70 is returned to the PC 46, which causes the instruction and those following it to be fetched and executed, thus resuming execution of instructions which were interrupted at the point the trap was taken.

The present invention may also be implemented to track and maintain multiple instruction addresses within a set of instructions. This allows CTI instructions to be in the same group as their targets. In addition, fewer or a greater number of instructions may be represented within a set of instructions. As a result, fewer or a greater number of age bits may be utilized in practicing the present invention.

Thus, although the invention has been described in terms of a certain preferred embodiment, other embodiments apparent to those skilled in the art are also within the scope of this invention. Accordingly, the scope of the invention is intended to be defined only by the claims which follow.

What is claimed is:

1. A circuit for generating addresses of a set of program instructions in a processing system by maintaining an address offset of each instruction in the set of program instructions relative to a predetermined instruction in the set of program instructions, comprising:

a first circuit for transferring data and program instructions within the processing system, the first circuit including a register having an age bit field with a value indicative of the age of an instruction relative to a predetermined instruction in a set of instructions and a valid bit field with a value indicative of the validity of the instruction;

a second circuit coupled to the first circuit for generating an address of a program instruction, the second circuit having an offset generation circuit for calculating the address offset based on the age bit field;

a memory for storing the data and the set of program instructions;

a program counter register for storing the address of the program instruction within the set of program instructions;

a third circuit coupled to the memory for transferring the data and the program instructions from the memory;

a first execution unit for executing the program instructions, the first execution unit providing a first trap signal when a trap occurs for the program instruction transferred to the first execution unit from the third circuit;

a second execution unit for buffering the addresses of the program instructions transferred from the program counter register; the second execution unit providing a second trap signal when a trap occurs for the program instruction transferred to the second execution unit from the third circuit; and wherein the first circuit further comprises a second register associated with the second execution unit, the second register having a valid bit field and an age bit field, and wherein the offset generation circuit comprising:

a selection circuit to combine a trap signal with the value to provide an age signal corresponding to the address offset, and an age prioritization circuit coupled to the selection circuit, the selection circuit being coupled to receive the first trap signal, the second trap signal, the values corresponding to the age and validity of the instruction associated with the first trap signal, the values corresponding to the age and validity of the instruction associated with the second trap signal, the selection circuit combining the first trap signal with the values corresponding to the age and validity of the instruction associated with the first trap signal to provide a first trap age signal, the selection circuit also combining the second trap signal with the values corresponding to the age and validity of the second trap signal with the values corresponding to the age and validity of the instruction associated with the second trap signal to provide a second trap age signal, the selection circuit providing the first and the second trap age signals to the age prioritization circuit which prioritizes the first and the second trap age signals to provide the address offset.

2. The circuit of claim 1, wherein the second circuit further comprises a FIFO buffer coupled to the program counter register for buffering the addresses of the program instructions transferred from the program counter register.

3. The circuit of claim 1, wherein the second circuit is for processing traps.

4. The circuit of claim 1, wherein the circuit is utilized in a pipelined process for maintaining program counters.

5. The circuit of claim 1, wherein the predetermined instruction is the oldest instruction in the set of instructions.

6. A method of generating addresses of a set of program instructions in a processor system by maintaining an address offset of each instruction in the set of program instructions relative to a predetermined instruction in the set of program instructions, the method comprising the steps of:

transferring program instructions from memory to first and second execution units;

setting a value of an age bit field within a register indicative of the age of the instruction with respect to a predetermined instruction in the set of program instructions based on the value of the age bit field;

transferring the value of the age bit field to a logic circuit;

providing a trap signal generated by the execution unit to the logic circuit when an instruction associated with the execution unit has taken a trap;

setting a value of a valid bit field in the register indicative of the validity of the program instruction and transferring the value of the valid bit field to the logic circuit;

setting the value of a valid bit field within a second register indicative of the validity of the program instructions;

setting the value of an age bit field within the second register indicative of the age of the instruction with respect to a first instruction in the set of instructions and providing a trap signal generated by the second execution unit to the logic circuit;

calculating the address offset of each instruction in the set of program instructions by combining a trap signal with the value to provide an age signal corresponding to the address offset, the calculating step further comprising the steps of receiving the trap signals from the execution units, combining each trap signal with the values of the age bit field and validity bit field of the instruction associated with each trap signal to provide a first trap age signal and a second age trap signal, and prioritizing the first and second age trap signals to provide the address offset;

adding the address offset to an address of the predetermined instruction to provide a resulting address; and providing the resulting address to a register for storing the resulting address.

7. The method of claim 6, wherein the method is utilized in a pipelined process.

8. The method of claim 6, wherein the predetermined instruction is the oldest instruction in the set of instructions.

9. A system for maintaining addresses of a set of program instructions in a processing system, comprising:

a memory for storing data and a set of program instructions; and a processor for executing the stored program instructions, comprising:

a first circuit for transferring the data and program instructions from the buffer to the execution unit, the first circuit including a register associated with the execution unit, the register having a valid bit field with a value indicative of the validity of a corresponding instruction within the set of program instructions and an age bit field with a value indicative of the age of the instruction with respect to a predetermined instruction in the set of program instructions;

a second circuit for generating an address of each instruction in the set of program instructions, the second circuit having an offset generation circuit for calculating an address offset based on the age bit field, the offset generation circuit comprising a selection circuit to combine a trap signal with the value to provide an age signal corresponding to the address offset;

a program counter register for storing the addresses associated with the program instructions;

a third circuit coupled to the memory for transferring the data and the program instructions from the memory;

a first execution unit for executing the program instructions, the first execution unit providing a first trap signal when a trap occurs for the program instruction transferred to the first execution unit from the third circuit;

a second execution unit for buffering the addresses of the program instructions transferred from the program counter register; the second execution unit providing a second trap signal when a trap occurs for the program instruction transferred to the second execution unit from the third circuit; and wherein the first circuit further comprises a second register associated with the second execution unit, the second register having a valid bit field and an age bit field, and wherein the offset generation circuit comprising:

a selection circuit to combine a trap signal with the value to provide an age signal corresponding to the address offset, and an age prioritization circuit coupled to the selection circuit, the selection circuit being coupled to receive the first trap signal, the second trap signal, the values corresponding to the age and validity of the instruction associated with the first trap signal, the values corresponding to the age and validity of the instruction associated with the second trap signal, the selection circuit combining the first trap signal with the values corresponding to the age and validity of the instruction associated with the first trap signal to provide a first trap age signal, the selection circuit also combining the second trap signal with the values corresponding to the age and validity of the second trap signal with the values corresponding to the age and validity of the instruction associated with the second trap signal to provide a second trap age signal, the selection circuit providing the first and the second trap age signals to the age prioritization circuit which prioritizes the first and the second trap age signals to provide the address offset.

10. The system of claim 9, wherein the second circuit further comprises a program counter FIFO buffer coupled to the program counter register for buffering the addresses of the program instructions transferred from the program counter register.

11. The system of claim 9, wherein the second circuit is used to process traps.

12. The system of claim 9, wherein the processing system is used in a pipelined processor.

* * * * *